J. DEMPSEY
Thill Coupling.
No. 89,032.  Patented April 20, 1869.
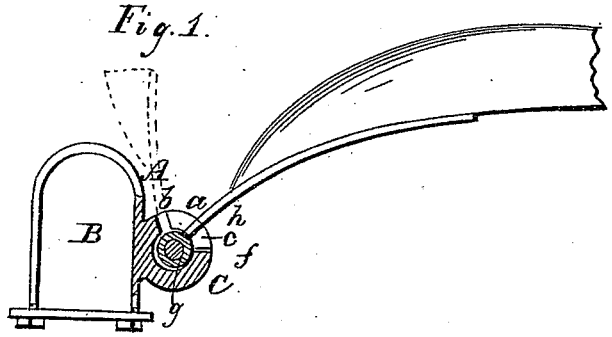
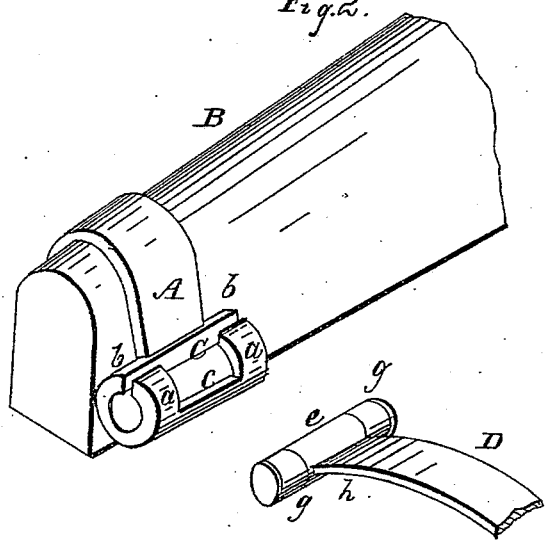
Witnesses.  
Inventor.  
James Dempsey

JAMES DEMPSEY, OF GENEVA, NEW YORK, ASSIGNOR TO HIMSELF AND NATHAN LEVY, OF SAME PLACE.

Letters Patent No. 89,032, dated April 20, 1869.

IMPROVEMENT IN THILL-COUPLING.

The Schedule referred to in these Letters Patent and making part of the same.

*To all whom it may concern:*

Be it known that I, JAMES DEMPSEY, assignor to myself and NATHAN LEVY, both of Geneva, in the county of Ontario, and State of New York, have invented a certain new and useful Improvement in Thill and Pole-Couplings; and I do hereby declare that the following is a full and exact description thereof, reference being had to the accompanying drawings, making part of this specification, in which—

Figure 1 is a section of my improved coupling, and Figure 2, a perspective view of the parts separated.

Like letters of reference indicate corresponding parts in both figures.

My invention consists in a bearing of the thill or pole-iron, of peculiar form, employed in combination with an open slotted socket of the jack, in the manner and for the purpose hereinafter set forth.

In the drawing—

A indicates the jack, which is of ordinary form, and attached to axle B.

On the front of this jack is formed a socket, C, which has two circular heads, $a\ a$, at the ends, with vertical slots, $b\ b$, in top, entering them, and also an open space, $c$, in the centre.

The thill or pole-iron D has a bearing, $e$, with two journals, $f f$, turned down on each side of the centre, of smaller diameter, to receive sections, $g\ g$, of rubber tube, which are stretched thereon, so that the surface will stand flush with or project a little beyond the plane surface of the bearings, as clearly shown.

The shank $h$ is made of such thickness as to pass edgewise into the slots $b\ b$ of the socket.

In coupling the parts, the thill or pole is elevated, so as to turn the shank $h$ in coincidence with one of the slots $b$, when the whole bearing $e$ enters socket C by a lateral action, the rubber sections $g\ g$ resting and turning in heads $a\ a$, while the shank $h$ turns down in space $c$. In this position, the parts cannot become disconnected under ordinary action.

The novelty, in this case, consists in the employment of the rubber sections $g\ g$, covering the journals of the thill-iron, and the arrangement, in connection therewith, of the bearing-heads $a\ a$, with the narrow vertical slots $b\ b$.

The rubber forming the bearing-portion prevents rattling.

No nuts or bolts are required, which is another safeguard against rattling.

The heads $a$ furnish the necessary bearing to the cushions, while the narrow vertical slots $b$ allow the thill or pole to be held elevated when not in use, by slipping the shank $h$ into them a little distance, as shown by red lines, thus avoiding the necessity of bracing them up by a stick of wood, or otherwise, as is usually done.

I am aware that the jack has been heretofore provided with an open-topped hook, into which the thill-eye has been engaged by hooking, when elevated; but such is not the equivalent of my invention, since the action of coupling is vertical instead of lateral, and the rubber sections are not employed, and the thill or pole cannot be held elevated by the coupling itself.

What I claim as my invention, and desire to secure by Letters Patent, is—

The combination of the thill-iron D, having the rubber bearings $g\ g$, with the socket C, provided with the heads $a\ a$, and narrow slots $b\ b$, the whole arranged as described, and operating in the manner and for the purpose specified.

In witness whereof, I have hereunto signed my name, in the presence of two subscribing witnesses.

JAMES DEMPSEY.

Witnesses:
GEO. PROUDFIT,
JOHN H. MEHON.